United States Patent
Schmidt-Schäffer et al.

(10) Patent No.: US 9,261,874 B2
(45) Date of Patent: Feb. 16, 2016

(54) METHOD FOR CONFIGURATION AND/OR EQUIPMENT OF A VEHICLE CABIN, IN PARTICULAR OF AN AIRCRAFT

(75) Inventors: Tobias Schmidt-Schäffer, München (DE); Benjamin Becker, München (DE); Ulrich Seifert, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 556 days.

(21) Appl. No.: 13/641,234

(22) PCT Filed: Apr. 14, 2011

(86) PCT No.: PCT/DE2011/000414
§ 371 (c)(1),
(2), (4) Date: Oct. 15, 2012

(87) PCT Pub. No.: WO2011/127911
PCT Pub. Date: Oct. 20, 2011

(65) Prior Publication Data
US 2013/0035906 A1 Feb. 7, 2013

(30) Foreign Application Priority Data
Apr. 14, 2010 (DE) .......................... 10 2010 014 899

(51) Int. Cl.
| G05B 19/4093 | (2006.01) |
| G06F 17/50 | (2006.01) |
| B64F 5/00 | (2006.01) |
| G05B 17/02 | (2006.01) |

(52) U.S. Cl.
CPC ............ *G05B 19/40931* (2013.01); *B64F 5/00* (2013.01); *G05B 17/02* (2013.01); *G06F 17/50* (2013.01); *G06F 17/5095* (2013.01); *G05B 2219/35152* (2013.01); *G05B 2219/35155* (2013.01); *G06F 2217/46* (2013.01)

(58) Field of Classification Search
CPC ............................ G06F 17/5009; G06F 17/50
USPC ........................................................ 703/2, 1
See application file for complete search history.

(56) References Cited

U.S. PATENT DOCUMENTS

| 8,069,019 | B2 * | 11/2011 | Cazals .............................. 703/2 |
| 2002/0026296 | A1 | 2/2002 | Lohmann et al. |
| 2004/0153295 | A1 | 8/2004 | Lohmann et al. |
| 2005/0071138 | A1 | 3/2005 | Conchi et al. |
| 2005/0209830 | A1 * | 9/2005 | Lee et al. .......................... 703/1 |
| 2010/0049475 | A1 * | 2/2010 | Cazals .............................. 703/1 |

FOREIGN PATENT DOCUMENTS

| DE | 100 41 031 A1 | 3/2002 |
| DE | 100 46 742 A1 | 4/2002 |
| DE | 10 2009 040731 A1 | 3/2011 |
| DE | 10 2009 043327 A1 | 3/2011 |

OTHER PUBLICATIONS

International Search Report mailed Sep. 29, 2011 (PCT/DE2011/000414); ISA/EP.

* cited by examiner

*Primary Examiner* — David Silver
(74) *Attorney, Agent, or Firm* — Banner & Witcoff, Ltd.

(57) ABSTRACT

The invention relates to a method for the automatic configuration and/or equipment of a vehicle cabin, more particularly of an aircraft, wherein the cabin (1) is subdivided into a plurality of zones (A, B, C, D, E) and wherein at least one parameter zone (A, C, E) and one dynamic zone (B, D) are provided, comprising the following steps: —selection of one or more individual modules from a pool of individual modules, —automatic arrangement of the at least one selected individual module in the parameter zone in accordance with at least one predetermined individual module parameter for the complete configuration of the meter zone, —selection of one or more individual components from a pool of individual components, —automatic calculation of an individual component configuration of the dynamic zone in accordance with the arrangement of the individual modules in the parameter zone and automatic arrangement of individual components in the dynamic zone in accordance with the calculated individual component configuration. The invention furthermore relates to a system and a computer program.

19 Claims, 5 Drawing Sheets

Figure 1:
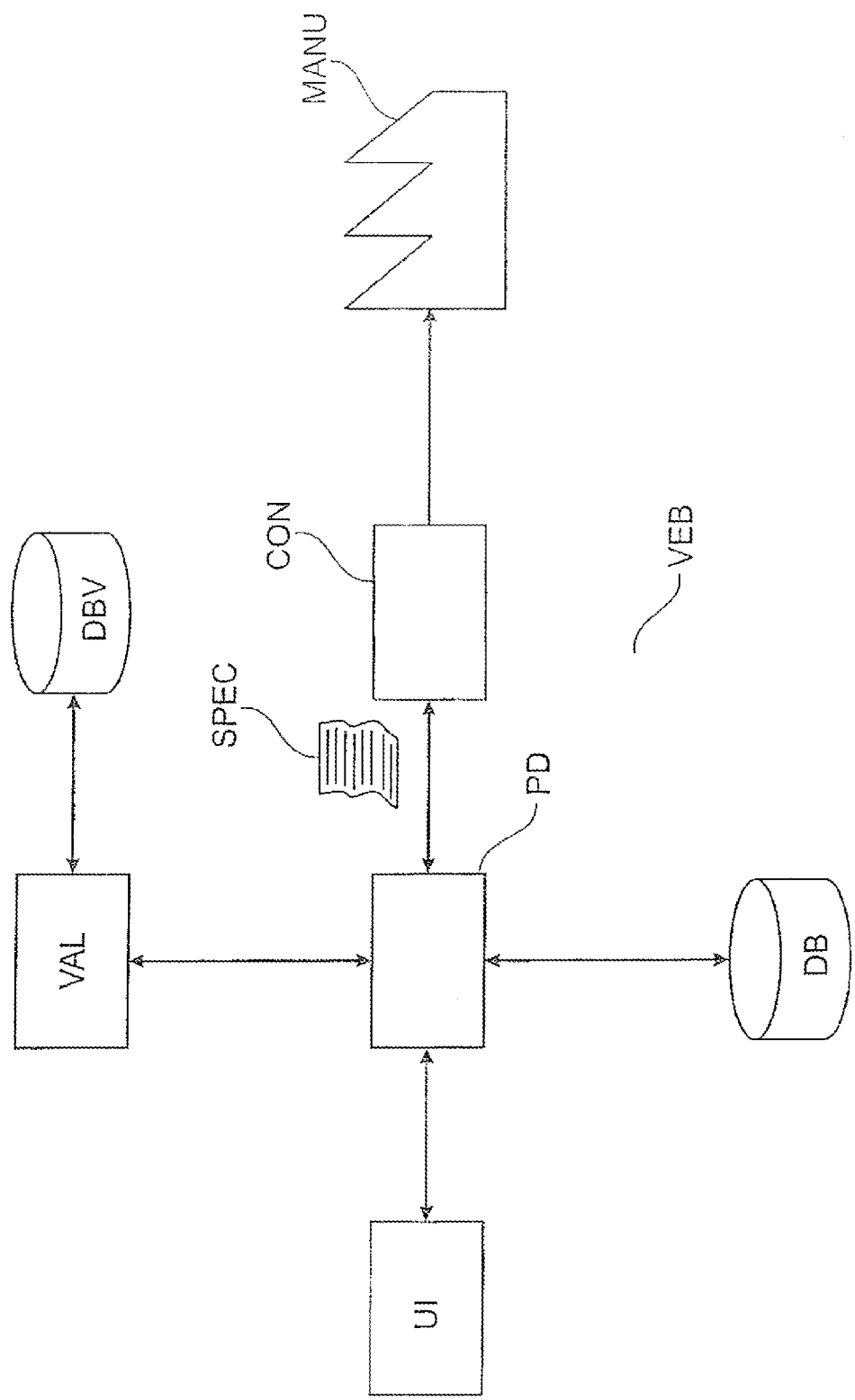

METHOD FOR CONFIGURATION AND/OR EQUIPMENT OF A VEHICLE CABIN, IN PARTICULAR OF AN AIRCRAFT

CROSS-REFERENCE TO RELATED APPLICATIONS/PRIORITY CLAIM

The present application is a U.S. National Phase filing of International Application No. PCT/DE2011/000414, filed on Apr. 14, 2011, designating the United States of America and claiming priority to German Patent Application No. 10 2010 014 899.7 filed Apr. 14, 2010, and the present application claims priority to and the benefit of all the above-identified applications, which are all incorporated by reference herein in their entireties.

The invention relates to a method for automatic configuration and/or equipment of a vehicle cabin, in particular of an aircraft.

BACKGROUND OF THE INVENTION

In vehicles for transporting passengers there is a need to equip these with appropriate fittings.

A passenger airplane for example consists of a large number of components. Many of these components may be and are ordered by the respective airlines in a certain specification, modification or configuration, i.e. they are produced according to customer requirements. There is a standard airplane that is appropriately developed and approved. Aircraft ordered by a customer are always developed and approved with regard to the standard airplane. This occurs by tracking the amendments (modifications) to the standard airplane in order to represent the corresponding customer configuration.

Each airline has, in addition to certain wishes with regard to the interior fittings of the aircraft, requirements that are prescribed by the particular national aviation authorities. Above all, however, technical requirements with regard to flight mechanics, structural mechanics and vibration mechanics and connection requirements with regard to ventilation, hydraulics, electrics, etc. must be taken into account.

The provision of the respective differently configured components for final installation takes place within the context of so-called "realization engineering". In this case the different configurations or specifications that are required by the airline are recorded.

On the basis of this recorded specification material, construction documents are then prepared, such as for example construction plans, parts lists and other documentation necessary for equipping a cabin of an aircraft. Due to the immense range of possible combinations this pre-engineering step is time-consuming and expensive. Thus there is a need in the aircraft industry for development to be configured more efficiently by targeted module-orientated pre-engineering and, based thereon, production of suitable assemblies for the airplane.

Furthermore, for example, an airplane cabin usually has connections, the position of these connections being fixed for example on the basis of safety rules. It is therefore necessary for the components with which the aircraft cabin is to be equipped to be disposed in the aircraft cabin in such a way that the connections of the aircraft cabin can be connected to the corresponding connections on the components.

Furthermore it is necessary for space in an airplane cabin to be utilized efficiently, so that the greatest possible number of passengers can be transported, thereby in particular reducing the fuel consumption per passenger.

For this purpose proposed solutions are already known in the prior art. Thus DE 100 41 031 A1 discloses a method for configuration of component arrangements, i.e. for definition of the spatial arrangement of components relative to one another and for optimization thereof with regard to position and/or amount, preferably in an airplane. In order to configure the arrangement of the components automatically and in order, if appropriate, to create production documents automatically by means of a data processing program, it is provided that the airplane type on which the construction documents are based is input into a configuration tool of a data processing system, that the airplane-specific geometry is stored in a drawing module of the data processing system stored and is automatically loaded therefrom and displayed, that in a functional and data analysis the necessary geometric objects or components are determined and described mathematically, position rules are mapped mathematically and stored and added to the airplane-specific geometry in the drawing module of the data processing system, and that in the configuration tool of the data processing system the objects or components together with the airplane-specific geometry are automatically optimally configured spatially relative to one another according to a defined set of rules taking account of the customer requirements. However, a disadvantage of this is that a calculation with regard to the configuration of the components in the airplane cabin must be performed for the entire airplane cabin, which makes the calculation time-consuming and requires considerable computing power.

BRIEF SUMMARY OF THE INVENTION

The object of the invention may therefore be regarded as providing a method that overcomes the existing disadvantages and satisfies the above-mentioned requirements. In particular the method should make it possible for configuration and/or equipment of a cabin of an aircraft to be carried out efficiently and quickly, with regard to both the production and the approval or acceptance.

The object is achieved by a method according to claim 1, by a computer program according to claim 10 and by a system according to claim 11. Advantageous embodiments of the invention are the subject matter of dependent subordinate claims.

The invention embodies the idea of providing a method for automatic configuration of a vehicle cabin, in particular of an aircraft, wherein the cabin is subdivided into a plurality of zones and wherein at least one parameter zone and one dynamic zone are provided, comprising the following steps:

selection of one or more individual modules from a pool of individual modules, automatic arrangement of the at least one selected individual module in the parameter zone in accordance with at least one predetermined individual module parameter for complete configuration of the parameter zone, selection of one or more individual components from a pool of individual components, automatic calculation of an individual component configuration of the dynamic zone in accordance with the arrangement of the individual modules in the parameter zone and automatic arrangement of individual components in the dynamic zone in accordance with the calculated individual component configuration.

Furthermore the invention embodies the idea of providing a system for automatic configuration of a vehicle cabin, in particular of an aircraft, wherein the system is designed in such a way that it can carry out the method according to the invention and it includes the following:
- an input device for capturing a user input,
- a configuration device connected to the input device,
- wherein the configuration device has a processor and a memory device for storing the individual module list, and
- a display device for displaying the individual component configuration.

According to the invention a vehicle may be a ship, a bus, a train or an aircraft, such as for example an airplane, an airship, a helicopter, etc. By way of example reference is made below to a passenger airplane.

According to the invention the cabin is subdivided into a plurality of zones, wherein the different zone types "parameter zone" and "dynamic zone" are provided here. In this case a parameter zone may for example be an entry zone, i.e. an area that is subject to the predefined limitations predetermined by particular boundary conditions, in this case a door and predetermined paths for walking or moving about. Furthermore a dynamic zone may be defined as a passenger zone, i.e. a zone in which for example rows of passenger seats are arranged dynamically, wherein a limitation may be provided by a start or end parameter predefined by a parameter zone. For example the cabin is sub-divided into a parameter zone and a dynamic zone. In particular the cabin may also be sub-divided into a plurality of parameter zones and/or a plurality of dynamic zones.

An individual module is selected from a pool of individual modules, wherein a plurality of individual modules can also be selected from the pool. These may be understood for example as virtual data of individual modules that are stored on a database system. Then the selected individual module or the selected individual modules is/are arranged in the parameter zone. This arrangement is carried out in accordance with at least one predetermined individual module parameter. In the arrangement an algorithm takes into account the technical boundary conditions, such as permissible weight, mechanical, electrical and hydraulic connections, etc. That is to say that only arrangements that are technically permissible by the algorithm, i.e. found to be valid, are possible. This applies all the more in the arrangement of a plurality of individual modules, where for example minimum areas and paths for moving and walking about must be taken into account. After the arrangement the parameter zone is completely configured, in other words a subsequent change to the configuration of the parameter zone is not provided. In this case in particular the size and the boundaries of the parameter zone are defined, i.e. for example it is defined here whether the boundary of the parameter zone is formed by open areas or by a rigid partition. In this case it may in particular be provided that a user selects the individual module or the individual modules.

Then one or more individual components is/are selected from a pool of individual components.

According to the invention an individual component configuration of the dynamic zone is then calculated. This calculation takes place in accordance with the arrangement of the individual modules in the parameter zone. In other words the arrangement of the individual modules in the parameter zone determines the individual component configuration. For example, a minimum distance between an individual module and an individual component can be taken into account in this calculation. In the configuration of the dynamic zone an algorithm takes into account not only the parameters of the parameter zone but also the technical boundary conditions such as the center of gravity, connection situation, paths for walking or moving about, etc.

Finally, individual components are then arranged in the dynamic zone in accordance with the calculated individual component configuration. In this case the algorithm only allows permissible arrangements, i.e. in particular no arrangements are accepted that contravene the technical requirements, e.g. requirements relating to flight or structural mechanics. The selection of the individual components again involves a pool of different individual components.

The equipping process itself, i.e. the production system or assembly of the modules and components then takes place based on the automated configuration. In this case the production may for example include the sub-division of the zones by means of corresponding markers. The selection may then take place for example from a warehouse with corresponding modules or components. The arrangement then takes place physically on the basis of the calculations, i.e. the modules and components are arranged and fitted in the airplane cabin.

A parameter zone may be occupied by an individual module, for example a galley module or a toilet module, wherein the positioning and system connections thereof are also correspondingly defined. As a result the complexity is reduced by comparison with the prior art. These modules define in particular a series of parameters for the dynamic zones bordering the parameter zone, in particular with regard to their start and end position and the connections for systems (cable harnesses, etc). Furthermore the parameter zones of the doors define all systems that are necessary for maintenance thereof. These systems are for example waste water, fresh water, air conditioning, . . . and also extend accordingly through the dynamic zones. The configuration of the modules that are contained in such a parameter zone is limited by the modules and the zone. So a galley module should not exceed a certain weight and an appropriate power consumption. The main complexity and variability of the cabin should be mapped and limited in a modular manner.

A dynamic zone is configured in accordance with several customer parameters as well as the parameters of the parameter zone. The elements contained therein are rows of seats, wall claddings . . . and the wiring therefor (seat-to-seat and the rest of the wiring such as the wiring for the personal service units in the ceiling . . . ). This wiring and positioning of the elements in the zones uses the boundary conditions from the parameter zones and thus can easily provide a basis for the construction documents for inter alia cable harnesses, the rows of seats, the PSUs (personal service units) etc.

In this case the method according to the invention offers in particular the advantage of a configuration and/or equipment that saves time and requires less computing power, as the equipment and/or the configuration does not have to be calculated for the entire cabin, but only for one predetermined zone: the dynamic zone. Because the parameter zone is configured and/or equipped with individual modules, in particular with preconfigured individual modules, the expenditure on computing or the expenditure of time of a given computer system is reduced, or the necessary size and power of the computer system and thus the costs thereof can be minimized. Advantages of this system are, inter alia:

1. The certification of the airplane is simple to ensure since the door regions are defined (emergency evacuation, cabin staff per exit, aisle widths in the door region) and the parameters of the dynamic zone are defined (seats only at an appropriate distance from structures, for example a galley module or toilet module, in the door, seats only at positions that are visible from the crew seat, seats with a minimum spacing/pitch . . . )

2. Simple assembly. The door regions are relatively limited and static and so can be installed in a definable time frame. Possible mountings, system connections etc. have fewer variants. Fewer variants of the standard airplane are produced. The seat area have fixed interfaces for the wiring and the structure. Any optimization without the clearly defined boundary parameters would optionally lead to an airplane which is lighter but no longer 'buildable' since the wiring can no longer be assembled into meaningful cable harnesses or for the constructor the high product variance leads to a very small learning curve in manufacture.

According to a preferred embodiment of the invention, the at least one individual module parameter comprises a connection position of a hydraulic, electrical and/or mechanical connection. Thus it is possible in an advantageous manner that individual modules are arranged in the cabin in such a way that connections arranged in the cabin can be connected to corresponding counterpart connections arranged on the individual modules. The at least one individual module parameter may preferably comprise a center of gravity and/or an aerodynamic center of gravity of an aircraft. Thus in an advantageous manner the individual modules can be arranged in the cabin in such a way that an optimal secure and aerodynamic weight distribution is achieved. In particular such an optimal weight distribution enables a secure flight attitude of an aircraft.

In another exemplary embodiment of the invention at least two individual modules are selected from the individual module list or from the pool of individual modules and are joined to form a module package before the arrangement in the parameter zone. In other words, the individual modules can be pre-installed before the arrangement in particular outside the cabin. Thus for example two particularly large and cumbersome individual modules can be connected to one another outside the cabin, so that there is no need for installation in the generally confined cabin. This is advantageous in particular in tubular cabins, such as occur in airplanes or trains.

According to a particularly preferred embodiment of the invention the individual module list or the pool comprises a passenger seat row module, a galley module, a toilet module, a crew seat module, an emergency equipment module, in particular an oxygen supply module, a multimedia module, a staircase module and/or a cabin interior cladding module. For example the cabin interior cladding module comprises at least one luggage compartment. Thus a user may for example define a parameter zone by selecting a galley module, a staircase module and a toilet module. These three modules are then in particular arranged according to connections present in the parameter zone. For example a galley module, two toilet modules and two crew seat modules can be combined into a module package. Individual modules comprise in particular system connections, systems and structural parts in order to define the complete aircraft. It may also in particular be provided that one or more module packages is selected from a pool of module packages in order to completely configure the parameter zone. In particular within such a module package a change to the corresponding individual modules is no longer possible. Thus the complexity is further reduced in an advantageous manner, so that for example savings can be made on computing time and computing capacity. The individual modules also preferably comprise a floor module.

In a further exemplary embodiment of the invention at least one individual component is formed as a passenger seat. In this case the individual component configuration in particular predetermines a seat pitch between the passenger seats. In this case the seat pitch is defined as the spacing between a first passenger seat and a second passenger seat arranged opposite the first passenger seat. The individual component configuration can preferably predetermine a passenger seat width and/or a number of passenger seats in a row of passenger seats.

According to yet another preferred embodiment of the invention the parameter zone is provided as an entry zone and/or the dynamic zone is provided as a passenger zone. The entry zone comprises in particular an entry region having an entrance with a cabin door, through which passengers can enter the cabin or can leave the cabin. In particular at least one galley module and/or at least one toilet module and/or at least one crew seat module, in particular one crew seat, are arranged in the entry zone. The passenger zone preferably comprises at least one passenger seat and/or at least one row of passenger seats, in particular at least one passenger seat row module. In an advantageous manner, the invention enables a user to select in particular from already preconfigured individual modules for the parameter zone, wherein the user does not have to know where the individual connections for joining the individual modules are arranged. The parameter zone configuration is then calculated automatically on the basis of the individual module selection. Because only one calculation has to be carried out for the parameter zone configuration, considerable savings of computing capacity can be made.

According to another exemplary embodiment of the invention the calculation of the individual component configuration of the dynamic zone continues to be carried out dependent upon at least one dynamic zone parameter. One such dynamic zone parameter may for example be a passenger seat pitch. Thus the user can in particular specify that for example the last two rows of passenger seats should have a predetermined pitch. The pitch of the further rows of passenger seats is then automatically adapted. It may be provided that the dynamic zone parameter includes an adjustability of a seat back of a passenger seat. For example a user can specify that the passenger seats in the last row of passenger seats do not have adjustable seat backs. Thus such a last row of passenger seats requires less space than a row of passenger seats with adjustable seat backs. Thus the user can in particular specify a strategy as to how a passenger seat row layout should look. In this case the user does not have to have any idea about an optimal arrangement of the rows of passenger seats, since the optimal arrangement can be quickly calculated by means of the dynamic adaptation according to the invention of the individual component configuration to the predetermined individual module configuration of the parameter zone.

According to a particularly preferred embodiment of the invention an individual component parts list is produced according to the calculated individual component configuration. It may also be provided that in particular a CAD construction plan of the parameter zone and/or the dynamic zone is created. By way of example the method according to the invention can be carried out on a manufacturing plant for cabins, so that an individual module configuration and/or a calculated individual component configuration can be directly converted into a real assembly. The individual module configuration and/or the calculated individual component configuration are preferably first of all simulated virtually, for example in a three-dimensional view, before a real assembly is carried out.

In another exemplary embodiment of the invention the selected individual modules and/or the individual components are arranged in the parameter zone or the dynamic zone respectively if the corresponding arrangement has previously been validated.

Within the meaning of the invention "validation" and "validated" mean that a partial construction plan is valid ("validated") if the component specified therein, e.g. an airplane component, satisfies structural design requirements and the requirements ("rules") of the supervisory authorities, e.g. the Federal Civil Aviation offices. The process of testing whether the partial construction plan satisfies these requirements and the rules is designated here as "validation". A partial construction plan may in particular comprise an individual module, a package module and/or an individual component. It may in particular be provided that after each selection of an individual module a check is performed as to whether a corresponding arrangement is valid. It may also be provided for example that a validation is only carried out after a predetermined number of selected individual modules. Savings of computing time and computing capacity can be made here in an advantageous manner and the co-operation of a plurality of components can be taken into account. It may also be provided for example that a user can have a validation carried out manually.

When all requirements and specifications are satisfied, then the validation is successful. If not, then for example a warning message is output to a user, in particular in the form of a pop-up window on a screen or the configuration is not allowed, and the user is guided to a similar buildable solution. The user should then revise an input so that a new validation can be started.

However, it is also possible here that invalid selection possibilities/options are a priori ruled out ("grayed out") and if appropriate in the attempt of selection a more detailed reasoning is given with regard to the contravention of the rule. Thus the user may comprehend where the problem lies and possibly at a different location can alter the product so that the option is again enabled. Thus if for example the user selects a galley module and a disabled toilet module, wherein these two modules cannot be arranged jointly in a sub-divided entry zone because of their size, this is indicated to the user and he can then revise his original selection, for example by selecting the galley module.

DESCRIPTION OF PREFERRED EMBODIMENTS

Figure 2:
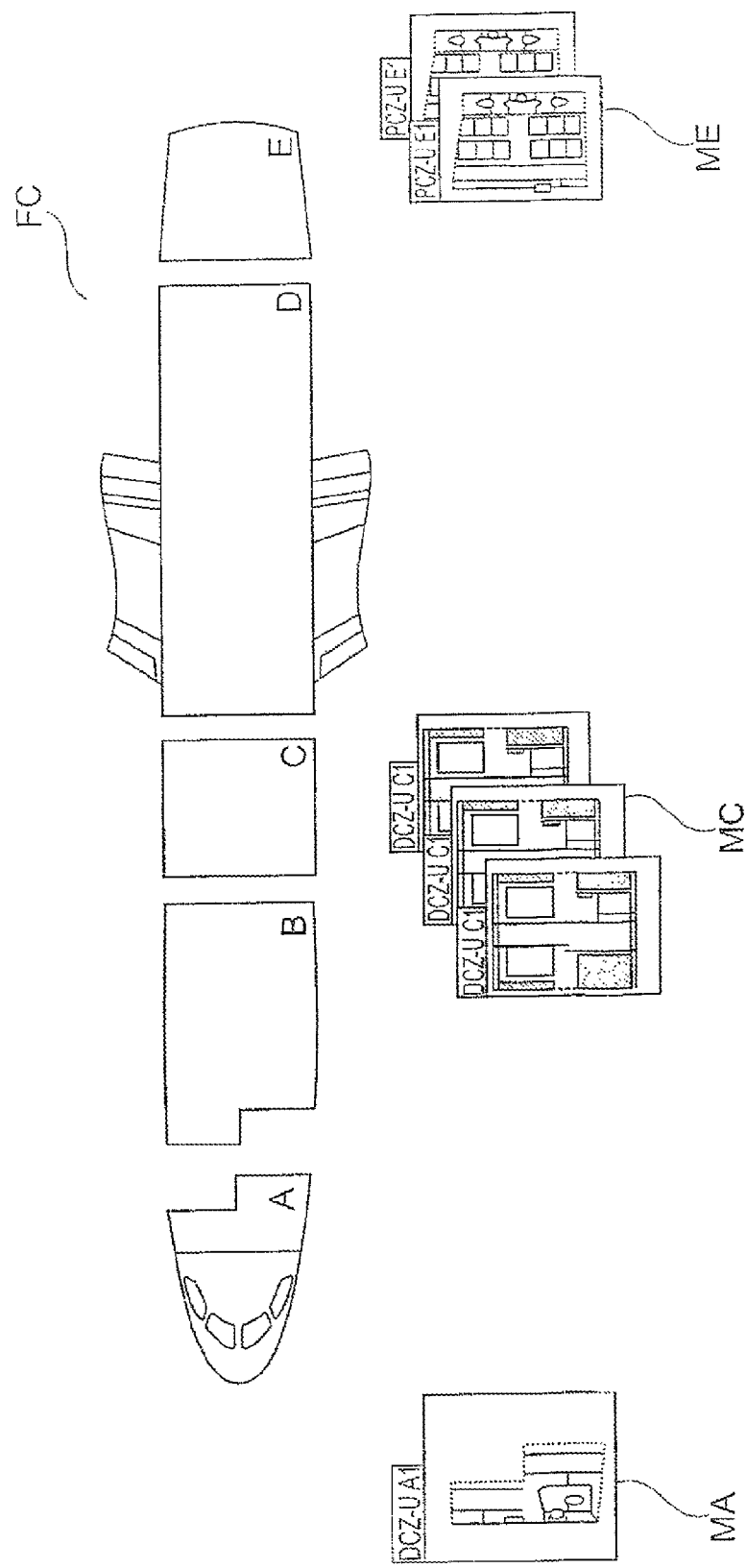
Figure 3A:
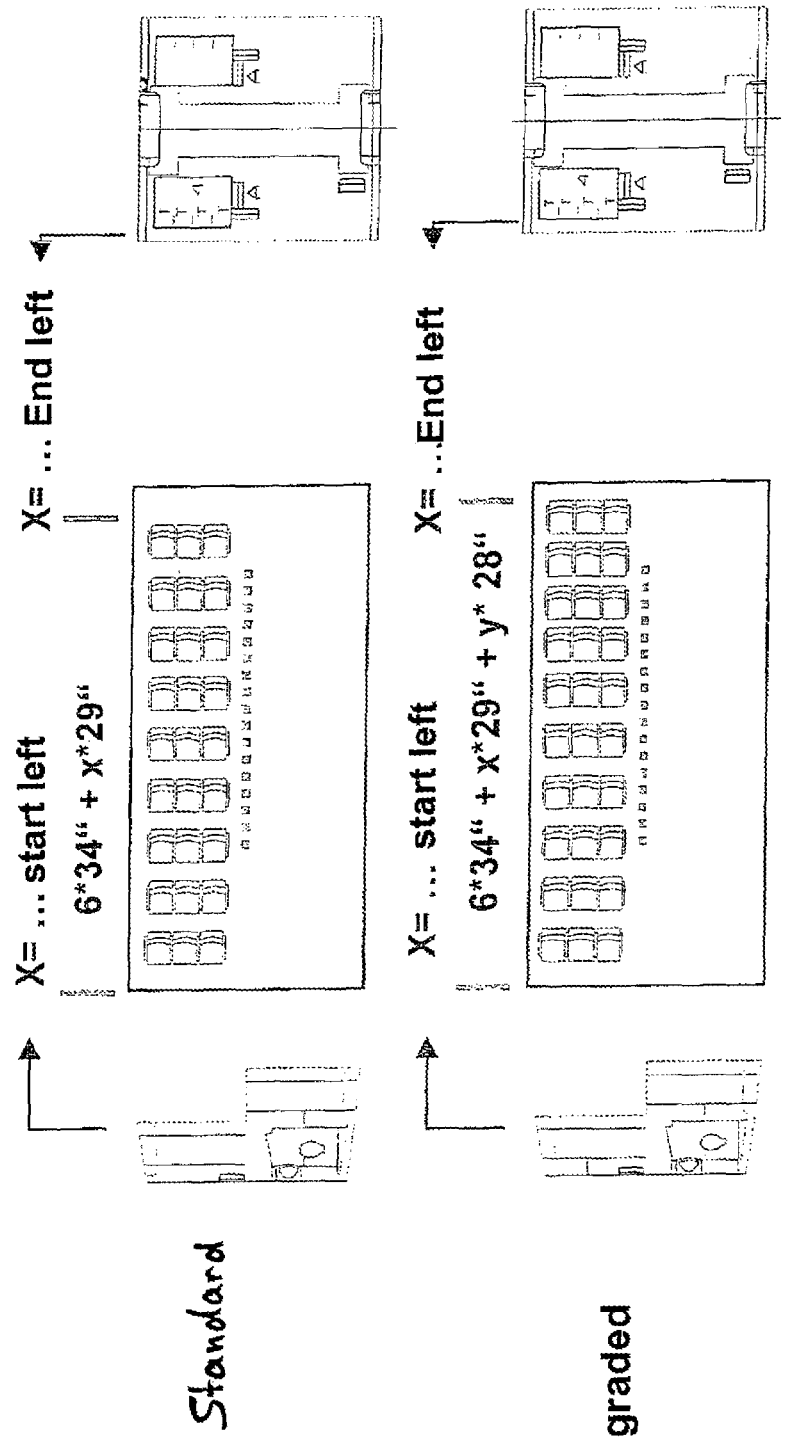
Figure 3B:
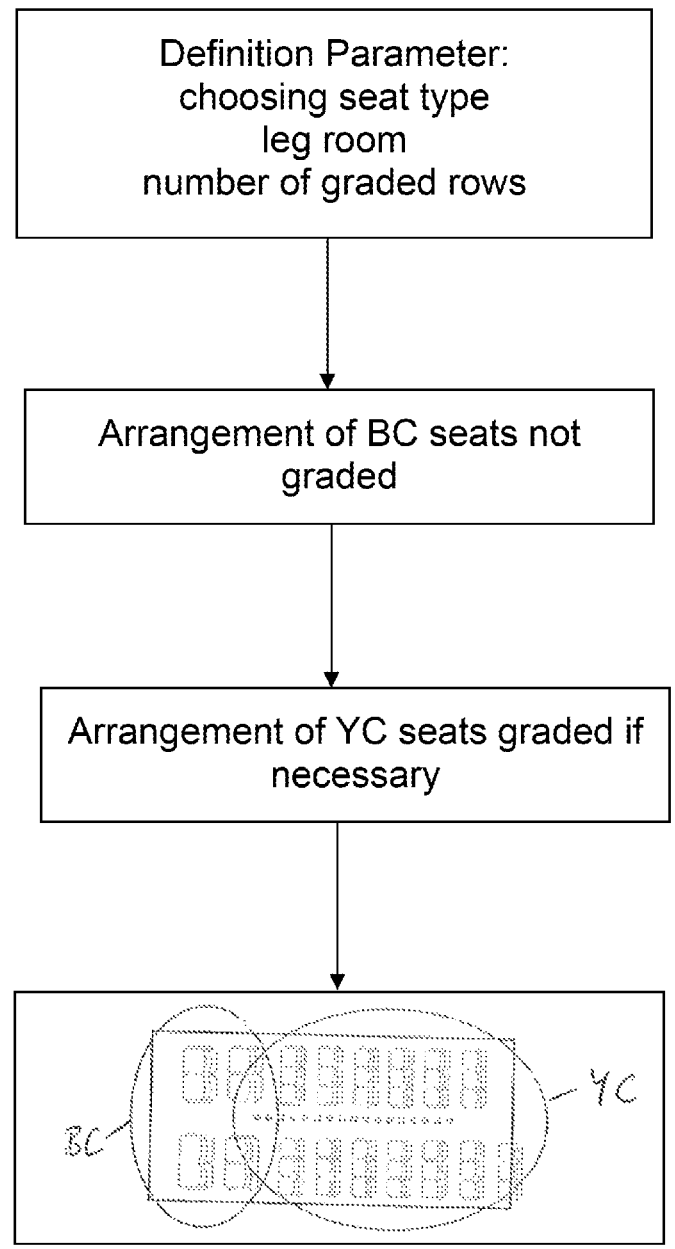
Figure 4:
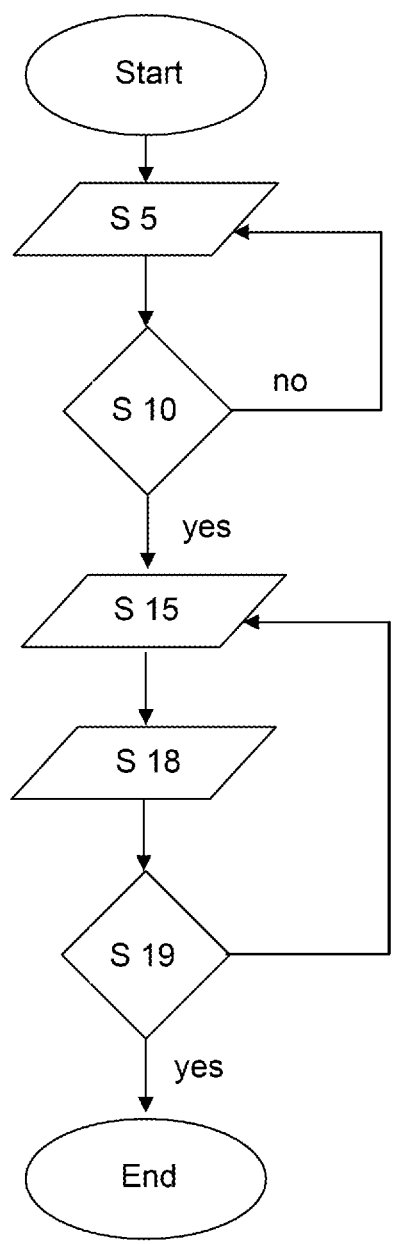

The invention is explained below in greater detail on the basis of preferred embodiments with reference to the drawings. In the drawings:

FIG. 1 shows a schematic block diagram of a production or manufacturing plant with an embodiment of the system according to the invention, FIG. 2a shows an airplane cabin made up of modules, FIGS. 3a and 3b show an individual component configuration schematically, and FIG. 4 shows a schematic flow chart of an embodiment of the method according to the invention.

FIG. 1 shows schematically a system VEB, which in the illustrated embodiment is set up for automatic production of installation plans and parts lists for a cabin configuration or equipment therefor. Furthermore the system may also have an interface CON that is suitable for direct transfer of planning and installation data to a manufacturing plant MANU. This means that processes in logistics (procurement of components and stock-keeping in automatic high-rack warehouses, etc.), process planning, process scheduling, provision of operating materials, and the like can be directly controlled and automated. This has direct effects on the physical equipment the cabin or the installation. Moreover may the system for example simulate the configuration of the cabin and display it in 3D. A module or an individual module is for example a galley or toilet cabin module.

The system VEB comprises a processor or computer PD, in particular comprising a processor that is controlled by an engineer or customer ("user") via a user interface UI or input device. The user interface UI in this case may be a graphical user interface GUI in which the control takes place via a menu structure that is known per se.

The user inputs his required selection for the configuration of the parameter zone via the user interface UI. In this case in particular the options for the element of the system are set automatically and the dimensioning/positioning is predetermined invariably by the individual module.

Technical parameters for galley or toilet cabin modules, as used in passenger cabins, would be for example the water pressure required by the user for the pipework or the specification of electrical wiring with regard to the electrical power for galley equipment in the galley cabins. As a rule, however, these parameters are not configured but the options for the element and the "parameters" can then be derived from the configuration. Accordingly rules ensure that these parameters are in a valid range, that is to say they are in particular feasible. The individual module parameters comprise these technical parameters.

A pool of already validated partial construction plans that may preferably comprise module packages and/or individual modules, from which the later construction plan SPEC is combined, are available on a database system DB, wherein the database system DB is stored in a memory device (not shown). Furthermore individual components can also be made available on the database system.

The partial construction plans and also the construction plan SPEC to be produced and in particular the individual modules can for example be provided as structured XML files.

A validation unit VAL is connected for communication purposes to the processor or computer PD and a rule database DBV. Rules and technical specifications predetermined by the Federal Civil Aviation offices are stored in the rule database DBV for example in tabular data structures. The tabular data structure comprises for example at least two columns. In addition to these rules, that are in particular associated with the "options" not described in greater detail here, global rules are also observed. There are product-specific rules that define the efficiency of the product and so guarantee feasibility.

For example the overall power consumption of the cabin is not managed by local limitations. Moreover there may also be rules governing the airplane model and the zone to which a module or individual module is to be assigned.

Identifiers for the respective modifiable elements of the partial construction plans are stored in one column. Such elements may for example be a color or a seat cover material. In the associated line in the second column the respective specification value is shown, for example as a code, numerical values or as a numerical range. Thus for example a color for a seat cover of a seat can be coded.

The appropriate features of the already pre-validated partial construction plans or pre-validated individual modules then takes place on the basis of the technical parameters derived from the options. This takes place by writing of the parameter into the corresponding element or module feature at the corresponding location in the XML-coded partial construction plan.

According to a further feature one or more of the individual elements within the already validated partial construction plans are either linked to one another or to elements in other already validated partial construction plans. This linking may extend to module features in module planes of the module partial construction plans. A dynamic-automatic (co-)modification of the other elements or module features linked to this element then takes place by modification of the element. The setting of these links is rule-based and also based on considerations that are necessary in design terms or on requirements of the national Federal Civil Aviation offices.

This means that the selected individual modules are arranged, in particular connected to one another, in accordance with the design-related framework conditions and the requirements of the national Federal Civil Aviation offices.

The partial construction plans are then combined by the computer PD. This combining may for example take place by merging of the individual XML files into a complete XML file, or also by connecting the partial construction plans to be combined via links.

However, the partial construction plans are actually only combined in particular when the validation unit VAL does not register any violation of the rules stored in the rule database DBV. The validation unit VAL may for example be formed as a "parser" that goes through the respective entries in the partial construction plans and compares the parameters entered there as new element or module feature with the values in the second column of the table in the rule database DBV. If a match is registered for each feature, that is to say if the value input by the user corresponds to the value in the second column of the table, the combination is deemed to be validated. Due to the linking a modification at the module level may also have the consequence that the validation also may not be successful. If it is not successful a signal is transmitted by the validation unit VAL to the computer PD. The computer PD will then transmit a warning signal to the user and will wait for input of revised parameters.

Thus the user predetermines the configuration of the parameter zone by selecting one or more individual modules. This arrangement is then validated by means of the validation unit VAL. A calculation of an individual component configuration takes place only if the parameter zone configuration has been validated.

The final construction plan SPEC then obtained can then be fed in for example into a suitable "back end" for further processing. For example, the final construction plan SPEC can be passed to a computer aided design (CAD) system in order to produce a graphical overall plan. This can then for example be cross-checked by an engineer.

Alternatively or additionally the final construction plan SPEC can also be fed into a control device or interface CON so that via this control device CON a manufacturing plant MANU can be supplied with those parts or individual components and/or individual modules that were specified in the finished construction plan SPEC.

Also for example industrial manufacturing robots can be controlled, or low-floor vehicles in warehouses, in order to provide components or structural parts having the particular dimensions or characteristics that are specified in the final construction plan SPEC or to supply or pre-install them at a predetermined target location for final installation.

In the following FIGS. 2 and 3, to simplify the illustration the modules and elements or the specification thereof as module partial construction plans are designated by the same reference signs.

FIG. 2 shows an overview of a modular airplane component. The airplane component is an airplane cabin FC. FC has a layout consisting of different zones A-E. In this example the zones are distinguished by the fact that doors are arranged in the zones A, C, E and none are arranged in the zones B, D. In this respect the zones A, C, E are formed as entry zones, so-called parameter zones, and the zones B and D are formed as passenger zones, so-called dynamic zones.

The rows of passenger seats are formed of passenger seats that are arranged in the passenger zones B and D (see also FIG. 3). MA and ME identify crew seat modules that are arranged in the zones A and E. MC identifies a module package formed from a galley module and a toilet module, wherein the module MC is arranged in the zone C.

FIGS. 3a and 3b show schematically an individual component configuration in the passenger zones B, D of FIG. 2. The individual component configuration is formed here by means of passenger seats. The entry zones A, C according to FIG. 2 that adjoin the passenger zones B and D define a fixed start position and a fixed end position for the rows of passenger seats. The row of passenger seats shown at the top in FIG. 3a is formed in a so-called standard configuration or non-graded configuration. The row of passenger seats shown at the bottom in FIG. 3a is formed in a so-called graded configuration. In the graded configuration at least one row of passenger seats is arranged both in the passenger zone and in the entry zone. This row of passenger seats projects, in a manner of speaking, into the entry zone. It may in particular be provided that the graded configuration is used for economy class (YC class) and the non-graded configuration is used for business class (BC class). It may also be provided that the corresponding rows of passenger seats for economy and business class are arranged jointly in a passenger zone (see FIG. 3b).

According to the flow chart in FIG. 3b the parameter definition occurs first. This includes the selection and number of seat types, e.g. BC (business class)=8. In this example the legroom is BC=34", in the first row BC=53". In economy class (YC) the legroom is for example YC=29", in the first row YC=48". The number of graded rows in this example is 4. Secondly, as shown in FIG. 3b, the BC seats are arranged in a non-graded manner and thirdly the YC seats are arranged in a graded manner, if necessary.

For the calculation of the optimal arrangement of the individual rows of passenger seats an algorithm $Y=f(X)$ may in particular be used that takes into account a curvature of the cabin, a required aisle width and/or passenger seat rail properties. On the basis of the input parameters the algorithm calculates the individual module parameters of the parameter zone and in particular on the basis of the formulae shown in FIGS. 3a and 3b the algorithm calculates an optimal position of the respective rows of passenger seats. In particular the number of passenger seats that can be arranged per row of passenger seats is also calculated.

According to the preferred embodiment the entry zones adjoining the passenger zones form a parameter zone. The passenger zones are configured dynamically according to the parameter zones that are thus completely configured and in this respect form a dynamic zone.

In order to save computing time during the validation by the validation unit VAL, the validation does not take place after every selection of a module, but for example only after the user has ended his selection. This is made possible in particular by the fact that the partial construction plans or individual module are already pre-validated in the database DB.

An XML coding of the module partial construction plan MB may for example appear as follows:

<module MA: module feature MA 1=ma 1,>

<element S: element feature S 1=s_1, ... >

A "flag" in the element feature "with monitor?" (S_1) has then been modified or set here to "yes" (s_1).

The validation unit VAL, the computer PD and the database system DB, DBV or the user interface UI can each be formed as discrete hardware or software modules.

According to one embodiment the implementation takes place on one single local computer.

According to one embodiment a client server structure is provided for a web-based embodiment of the validation device VEB. In this case the technical specification data is provided via the customer (for example the airline that wishes to order an airplane) from a client on which the user interface UI is presented. A data exchange with the computer PD ("server") then takes place via a network connection, such as for example the internet. PD is in turn connected via the network to the database system DBV or DB. If the finished construction plan SPEC has been validated and combined, it can then be sent via the network connection to the control unit CON in order to co-ordinate the further final installation in the plant MANU.

For clarification FIG. 4 shows a flow diagram of an embodiment of the method according to the invention.

A selection of at least one individual module for the configuration of the parameter zone takes place in a first step S5.

Then a validation of the parameter zone configuration takes place in step S10. If in this case it is ascertained that the parameter zone configuration is not valid, that is to say is not permissible, a user must make a new selection and the validation is then carried out again.

If the validation was successful, in a step S15 one or more individual components is/are selected from a pool of individual components.

In step S18 an individual component configuration is calculated according to the validated individual module configuration. Also the individual component configuration is validated in step S19. If the validation was not successful, the user must make a new selection of individual components, whereupon a new individual component configuration is then calculated.

If the validation is successful, the validated module partial construction plans, that is to say the individual module configuration and the individual component configuration, are put together in step S20, in order thus to obtain a validated final construction plan SPEC. Then the database DB can be updated by storage of the validated construction plan SPEC, together with an ID (identification number) of the customer. By iterative application of the method described above, starting from the valid construction plan SPEC as a new "partial construction plan", a complete construction plan for the entire airplane can then be produced successively with the aid of a computer by the system VEB.

To summarize, by means of the invention it is possible in particular, based upon a predetermined or completely configured parameter zone, for the positions of the individual passenger seats and/or the individual rows of passenger seats, in particular the pitches, to be calculated, that is to say to be adapted dynamically to the dynamic zone. In this case it may in particular be provided that the passenger seats are anchored by a guide rail.

The invention claimed is:

1. A method for automatically configuring a vehicle cabin, comprising:
    selecting, by a computing device, at least a first individual module and a second individual module from a pool of individual modules for automatic arrangement in the vehicle cabin, wherein the vehicle cabin is subdivided into a plurality of zones comprising at least one or more entry zones and a passenger zone different from the one or more entry zones;
    joining, by the computing device, the first individual module and the second individual module to form a module package;
    automatically arranging, by the computing device, the module package in the one or more entry zones in accordance with at least one predetermined individual module parameter for complete configuration of the one or more entry zones;
    selecting, by the computing device, one or more individual components from a pool of individual components, automatically calculating, by the computing device, an individual component configuration of the passenger zone in accordance with the arrangement of the module package in the one or more entry zones; and
    automatically arranging, by the computing device, the one or more individual components in the passenger zone in accordance with the calculated individual component configuration.

2. Method according to claim 1, wherein the at least one predetermined individual module parameter comprises a connection position selected from the group consisting of: a hydraulic connection, an electrical connection, a mechanical connection, or combinations thereof.

3. Method according to claim 1, wherein the pool of individual modules is stored in a database and comprises a module selected from the group consisting of: a staircase module, a galley module, a toilet module, a crew seat module, an emergency equipment module, in particular an oxygen supply module, a multimedia module, a cabin interior cladding module, and combinations thereof.

4. Method as claimed in claim 1, wherein at least one individual component is formed as a passenger seat.

5. Method according to claim 1, wherein the calculation of the individual component configuration of the passenger zone continues to be carried out dependent upon at least one passenger zone parameter.

6. Method according to claim 1, wherein a parts list of an individual component of the one or more individual components is formed according to the calculated individual component configuration.

7. Method according to claim 1, wherein the first individual module, the second individual module and the one or more individual components are arranged in the one or more entry zones and the passenger zone respectively if the corresponding arrangement has previously been validated.

8. A non-transitory computer-readable medium comprising computer-executable instructions, that when executed by a processor, cause the processor to:
    select at least a first individual module and a second individual module from a pool of individual modules for automatic arrangement in a vehicle cabin, wherein the vehicle cabin is subdivided into a plurality of zones comprising at least one or more entry zones and a passenger zone different from the one or more entry zones;
    join the first individual module and the second individual module to form a module package;
    automatically arrange the module package in the one or more entry zones in accordance with at least one predetermined individual module parameter for complete configuration of the one or more entry zones;
    select one or more individual components from a pool of individual components,
    automatically calculate an individual component configuration of the passenger zone in accordance with the arrangement of the module package in the one or more entry zones; and automatically arrange the one or more individual components in the passenger zone in accordance with the calculated individual component configuration.

9. A system for automatic configuration of a vehicle cabin, comprising:
an input device configured to capture a first user input selecting at least a first individual module, from a pool of individual modules for automatic arrangement in a vehicle cabin configuration of the vehicle cabin that is subdivided into a plurality of zones comprising at least one or more entry zones and a passenger zone, a second user input selecting a second individual module from the pool of individual modules, and a third user input selecting one or more individual components from a pool of individual components;
a configuration device connected to the input device comprising a processor and a memory device configured to store the pool of individual modules and computer-executable instructions that when executed by the processor, cause the configuration device to:
based upon receiving the first user input and the second user input from the input device, join the first individual module and the second individual module to form a module package and automatically arrange the module package in the one or more entry zones in accordance with at least one predetermined individual module parameter for complete configuration of the one or more entry zones;
based upon receiving the third user input from the input device, automatically calculating with the processor, an individual component configuration of the passenger zone in accordance with the arrangement of the module package in the one or more entry zones; and
automatically arrange the one or more individual components in the passenger zone in accordance with the calculated individual component configuration; and
output, on a display device the individual component configuration.

10. The computer-readable medium of claim 8, wherein the at least one predetermined individual module parameter comprises a connection position selected from the group consisting of: a hydraulic connection, an electrical connection, a mechanical connection, or combinations thereof.

11. The computer-readable medium of claim 8, wherein the pool of individual modules comprises a module selected from the group consisting of: a staircase module, a galley module, a toilet module, a crew seat module, an emergency equipment module, in particular an oxygen supply module, a multimedia module, a cabin interior cladding module, or combinations thereof.

12. The computer-readable medium of claim 8, wherein at least one individual component is formed as a passenger seat.

13. The computer-readable medium of claim 8, wherein the computer-executable instructions that, when executed by the processor, cause the processor to automatically calculate the individual component configuration of the passenger zone further cause the processor to continue the calculation dependent upon at least one passenger zone parameter.

14. The computer-readable medium of claim 8, wherein the computer-executable instructions, when executed by the processor, further cause the processor to form a parts list of an individual component of the one or more individual components according to the calculated individual component configuration.

15. The computer-readable medium of claim 8, wherein the computer-executable instructions, when executed by the processor, further cause the processor to:
validate the first individual module, the second individual module, and the one or more individual components for arrangement in the one or more entry zones and the passenger zone, respectively.

16. Method according to claim 1, further comprising:
causing display of a warning message to a user if an invalid combination of individual modules are selected; and
causing display of a guide to selecting a valid combination of individual modules.

17. Method according to claim 1, further comprising:
in response to selecting the first individual module, preventing a user from selecting a particular individual module, from the pool of individual modules, as the second individual module.

18. The computer-readable medium of claim 8, wherein the computer-executable instructions, when executed by the processor, further cause the processor to:
cause display of a warning message to a user if an invalid combination of individual modules are selected; and
cause display of a guide to selecting a valid combination of individual modules.

19. The computer-readable medium of claim 8, wherein the computer-executable instructions, when executed by the processor, further cause the processor to:
in response to a selection of the first individual module, prevent a user from selecting a particular individual module, from the pool of individual modules, as the second individual module.

* * * * *